US012746488B2

(12) United States Patent
He et al.

(10) Patent No.: US 12,746,488 B2
(45) Date of Patent: Sep. 29, 2026

(54) DOWNHOLE FILTER

(71) Applicant: Baker Hughes Oilfield Operations LLC, Houston, TX (US)

(72) Inventors: Zhi Yong He, Cypress, TX (US); Vighnesh Sivan, Rosharon, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 19/149,883

(22) PCT Filed: Jan. 31, 2025

(86) PCT No.: PCT/US2025/013989
§ 371 (c)(1),
(2) Date: Jul. 22, 2025

(87) PCT Pub. No.: WO2026/164614
PCT Pub. Date: Aug. 6, 2026

(65) Prior Publication Data

US 2026/0225009 A1 Aug. 6, 2026

(51) Int. Cl.

| | |
|---|---|
| ***B01D 29/90*** | (2006.01) |
| ***B01D 29/01*** | (2006.01) |
| ***E21B 43/08*** | (2006.01) |
| ***E21B 43/38*** | (2006.01) |
| *B33Y 80/00* | (2015.01) |

(52) U.S. Cl.
CPC ........... *B01D 29/902* (2013.01); *B01D 29/01* (2013.01); *E21B 43/08* (2013.01); *E21B 43/38* (2013.01); *B33Y 80/00* (2014.12)

(58) Field of Classification Search
CPC ....... E21B 43/08; E21B 43/38; B01D 29/902; B01D 29/01; B33Y 80/00
See application file for complete search history.

(56) References Cited

U.S. PATENT DOCUMENTS

| | | | |
|---|---|---|---|
| 3,437,135 | A | 4/1969 | Cox et al. |
| 5,909,771 | A | 6/1999 | Giroux et al. |

(Continued)

FOREIGN PATENT DOCUMENTS

| | | | | | |
|---|---|---|---|---|---|
| DE | 102017001100 | A1 * | 8/2018 | ........... | B01D 36/003 |
| GB | 2411668 | A * | 9/2005 | ........... | E21B 43/086 |

OTHER PUBLICATIONS

Notification of Transmittal of the International Search Report and the Written Opinion of the International Searching Authority, or the Declaration; PCT/US2025/013989; Mail date: Jun. 16, 2025; 10 pages.

*Primary Examiner* — Daniel P Stephenson
(74) *Attorney, Agent, or Firm* — Baker Hughes Patent Organization

(57) ABSTRACT

A work string including a chemical injection sub having a valve. The valve includes a housing, a bore extending along a longitudinal axis of the housing, a first port at a first axial location along the housing, a second port at a second axial location along the housing, a filter disposed within the bore, wherein the filter including an inlet at a first end and an outlet at a second end, and a floating device disposed within the filter, the floating device configured to allow a flow of fluid into the filter at the first end and to close the inlet based on an accumulation of debris within the filter.

15 Claims, 5 Drawing Sheets

(56) References Cited

U.S. PATENT DOCUMENTS

| | | | | |
|---|---|---|---|---|
| 8,501,012 | B2 * | 8/2013 | Himmel | B01D 35/02 166/177.5 |
| 9,038,736 | B2 | 5/2015 | Knobloch, Jr. et al. | |
| 9,447,658 | B2 | 9/2016 | He et al. | |
| 9,957,763 | B2 | 5/2018 | Greening et al. | |
| 10,753,321 | B2 * | 8/2020 | Sorger | B01D 46/0005 |
| 11,421,494 | B1 * | 8/2022 | Al Bayat | E21B 27/005 |
| 11,796,070 | B2 | 10/2023 | Meijer et al. | |
| 2006/0086674 | A1 * | 4/2006 | Morgan | B01D 29/27 210/767 |
| 2008/0302533 | A1 * | 12/2008 | Richard | E21B 43/08 166/304 |
| 2009/0205831 | A1 * | 8/2009 | Jacob | E21B 34/10 166/311 |
| 2009/0255878 | A1 | 10/2009 | Himmel | |
| 2011/0108279 | A1 * | 5/2011 | June | F17D 1/08 166/321 |
| 2013/0180592 | A1 * | 7/2013 | He | F16K 17/06 137/540 |
| 2014/0182855 | A1 | 7/2014 | Woodford | |
| 2015/0275624 | A1 * | 10/2015 | Coles | E21B 34/14 166/373 |
| 2024/0344432 | A1 * | 10/2024 | Snyder | E21B 34/08 |

* cited by examiner

DOWNHOLE FILTER

CROSS REFERENCE TO RELATED APPLICATIONS

This application is a National Stage application of PCT/US2025/013989, filed Jan. 31, 2025, which is incorporated by reference in its entirety herein.

BACKGROUND

In the resource recovery industry and fluid sequestration industry, a work string is disposed in a borehole and a chemical is injected into the borehole via the work string. Chemicals can convey debris which is to be removed before injection into the borehole. Chemical filtering is performed at a surface location, prior to injecting the chemical downhole into the borehole. There is a desire for chemical filtering to be performed downhole.

SUMMARY

Disclosed herein is a valve of a chemical injection sub for use downhole. The valve includes a housing, a bore extending within the housing along a longitudinal axis of the housing, a first port at a first axial location along the housing, a second port at a second axial location along the housing, a filter disposed in the bore, the filter having an inlet at a first end and an outlet at a second end, and a floating device disposed within the filter, the floating device configured to allow a fluid to flow into the filter at the first end and to close the inlet based on an accumulation of debris within the filter.

Also disclosed herein is a work string including a chemical injection sub having a valve. The valve includes a housing, a bore extending along a longitudinal axis of the housing, a first port at a first axial location along the housing, a second port at a second axial location along the housing, a filter disposed within the bore, wherein the filter including an inlet at a first end and an outlet at a second end, and a floating device disposed within the filter, the floating device configured to allow a flow of fluid into the filter at the first end and to close the inlet based on an accumulation of debris within the filter.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
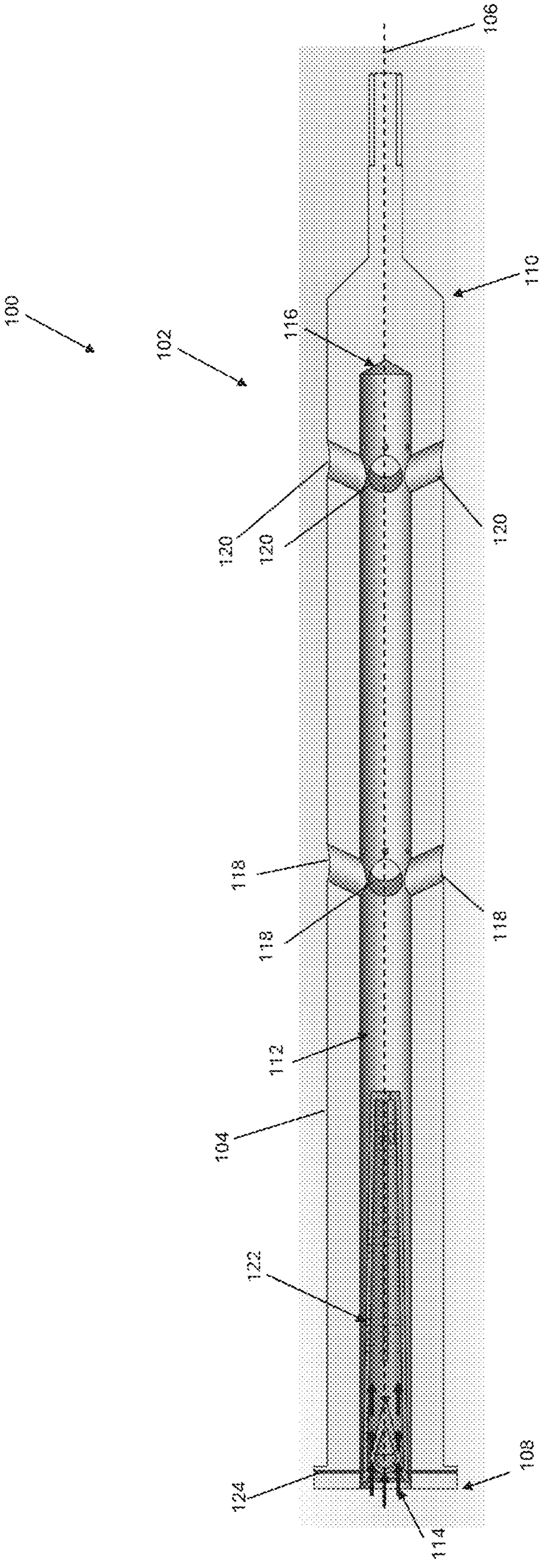
FIG. 1 is a side cross-sectional view of a valve suitable for use in a chemical injection sub, in an illustrative embodiment.

FIG. 1 is a side cross-sectional view 100 of a valve 102 suitable for use in a chemical injection sub, in an illustrative embodiment. The valve 102 includes a housing 104 extending along a longitudinal axis 106 from a first housing end 108 to a second housing end 110. In general, the chemical injection sub is disposed in a borehole with the first housing end 108 toward an uphole end of the borehole the second housing end 110 downhole of the first housing end 108. A bore 112 extends within the housing 104 along the longitudinal axis 106. The bore 112 includes an opening 114 at the first housing end 108 and a closed end 116 within the housing 104 near the second housing end 110. A first port 118 is located at a first axial location along the housing 104. A second port 120 is located at a second axial location along the housing 104. The first axial location is nearer to the first housing end 108 than the second axial location. The first port 118 is shown in FIG. 1 as a plurality of ports at the first axial location, each port connecting the bore 112 to a volume outside of the valve 102. Similarly, the second port 120 is shown in FIG. 1 as a plurality of ports at the second location, each port connecting the bore 112 to a volume outside of the valve 102.

A filter 122 is disposed in the bore 112 at the first housing end 108. When the chemical injection sub is initially conveyed downhole, the filter 122 is attached or coupled to the housing 104 at the first housing end 108 via a shear device 124. In various embodiments, the shear device 124 is an O-ring. The filter 122 allows a fluid to flow into the housing 104 at the first housing end 108. Any debris within the fluid is captured by the filter 122. When a shear force on the shear device 124 exceeds a selected shear threshold of the shear device 124, the shear device 124 separates, shears, ruptures or splits, thereby freeing the filter 122 from the housing 104 and allowing the filter 122 to move through the bore 112, such as by falling to the closed end 116. The shear force can be applied due to a combined weight of the filter 122 and any debris captured therein.

Figure 2:
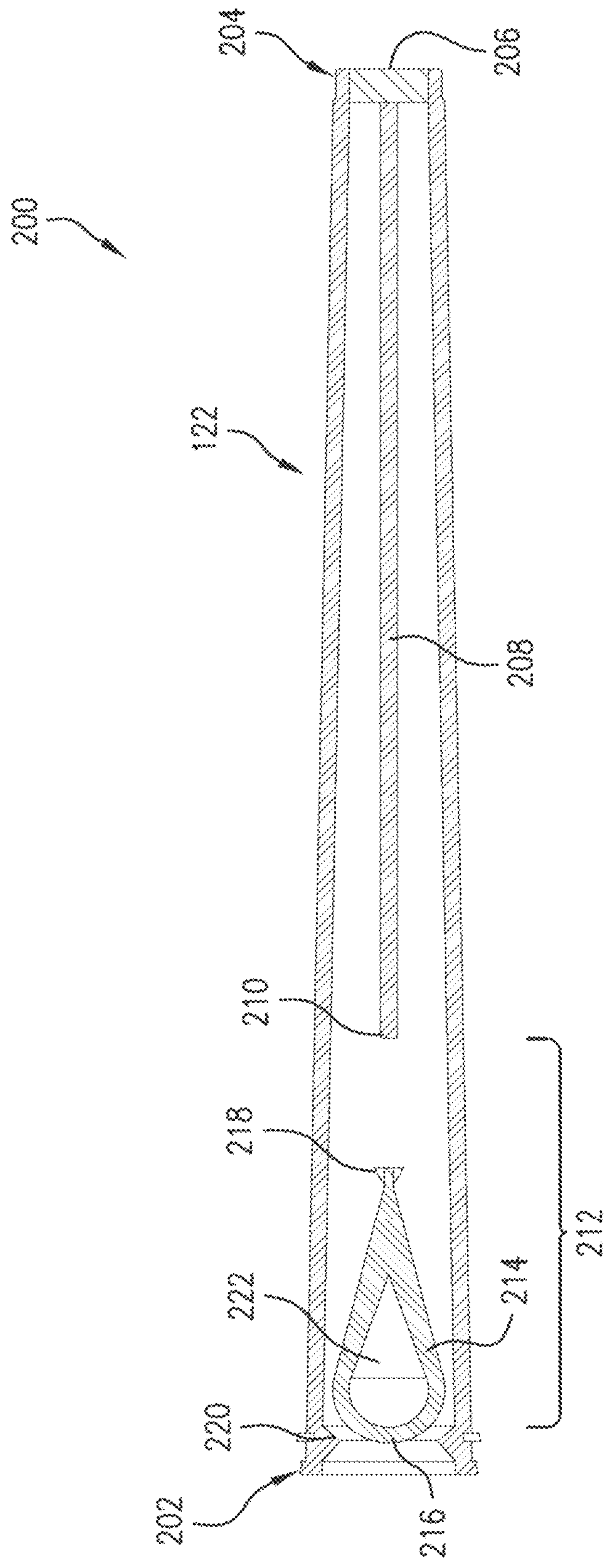
FIG. 2 is a side view of the filter, in an embodiment.

FIG. 2 is a side view 200 of the filter 122, in an embodiment. The filter 122 can be manufactured used various techniques, including additive manufacturing. The filter 122 is a tube having an inlet 202 at a first end and an outlet 204 at a second end. The tube can have a hollow cylindrical shape or hollow frustoconical shape, in various embodiments. Fluid flows into the filter 122 at the inlet 202 and out of the filter 122 at the outlet 204. The outlet 204 can have a screen 206 or other device that captures debris within the fluid.

A nose 208 extends from the outlet 204 towards the inlet 202 to a tip 210. The nose 208 is a long rod along the center of the filter 122, creating an annulus between the nose 208 and the outer wall of the filter 122. The tip 210 of the nose 208 is separated from the first end by a gap region 212.

A floating device 214 is contained within the gap region 212 and is movable within the gap region 212. The floating device 214 has a tear drop shape with a rounded end 216 and a pointed end or fin 218 opposite the rounded end 216. The floating device 214 is oriented in the gap region 212 with the rounded end 216 towards the inlet 202 and the fin 218 towards the outlet 204. The inlet 202 has a seat 220 with a diameter less than a diameter of the floating device 214, thereby preventing the floating device 214 from leaving the gap region 212 through the inlet 202. As the floating device 214 moves toward the outlet 204, at some point, the fin 218 makes contact with the tip 210, thereby limiting the range of axial motion of the floating device 214 to within the gap region 212. The tip 210 of the nose 208 prevents the floating device 214 from moving into a position toward the outlet 204 (generally under the influence of flow flowing through the filter 122) at which it would block of prevent fluid from flowing through the filter 122.

The floating device 214 can include an air pocket 222. As fluid passes through the filter 122, the air pocket 222 produces a buoyant force on the floating device 214 that biases the floating device 214 toward the inlet 202, allowing the floating device 214 to close the inlet 202.

A fluid carrying debris is circulated from the inlet 202 to the outlet 204. The fluid exits via the outlet 204, with the debris being capture by the screen 206. As the debris accumulates within the filter 122, the debris eventually rises to a level at which it traps the floating device against the seat 220. In other words, the accumulation of debris within the filter restricts a range of motion of the floating device toward the inlet. At or near this level of accumulation, the overall weight of the filter 122 (i.e., including the weight of the accumulated debris), exceeds a shear threshold of the shear device 124. At this point, the filter 122 is separated from the housing 104 and falls to the closed end 116.

Figure 3:
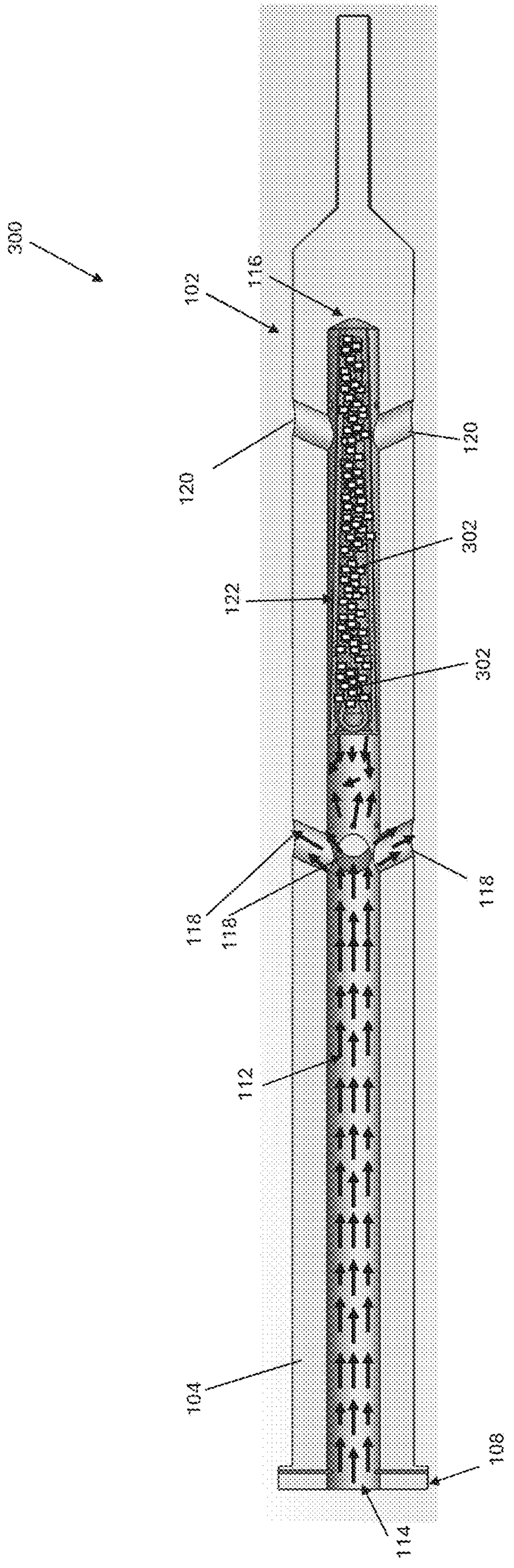
FIG. 3 shows a side cross-sectional view of the valve once the filter has separated from the housing.

FIG. 3 shows a side cross-sectional view 300 of the valve 102 once the filter 122 has separated from the housing 104. Due to the orientation of the housing 104, the filter 122 falls to the closed end 116 of the bore, thereby covering, closing or blocking the second port 120. Debris 302 is shown accumulated in the filter 122. Fluid entering into the housing 104 at the first housing end 108 is prevented from exiting through the second port 120 but is still able to flow out via the first port 118.

Figure 4:
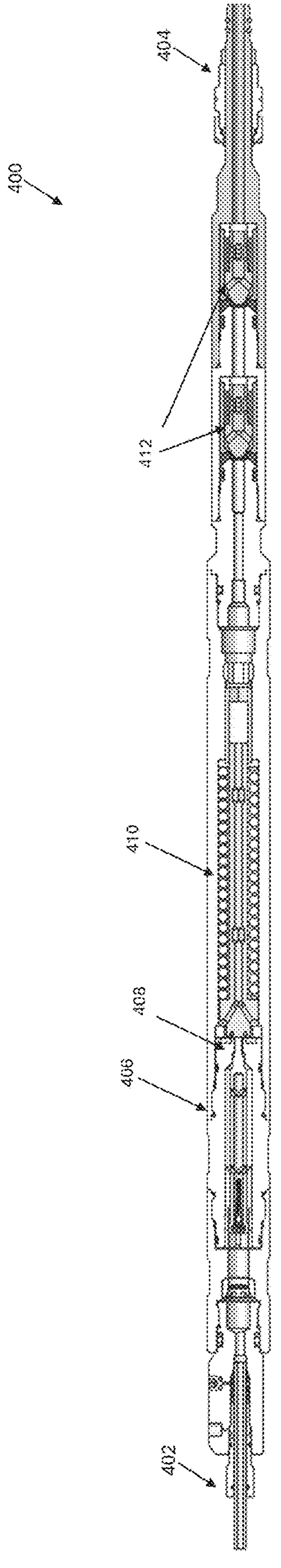
FIG. 4 shows a work string that includes the chemical injection sub, in one embodiment.

FIG. 4 shows a work string 400 that includes the chemical injection sub, in one embodiment. The work string 400 is designed to be permanently disposed downhole. The work string 400 extends from an uphole end (first work string end 402) to a downhole end (second work string end 404). The work string 400 includes the chemical injection sub 406 at the uphole end. The chemical injection sub 406 is coupled to the a back pressure valve 410 via a control line 408. The back pressure valve 410 is below the chemical injection sub 406. A dual check valve 412 is connected to a downhole end of the back pressure valve 410.

Figure 5:
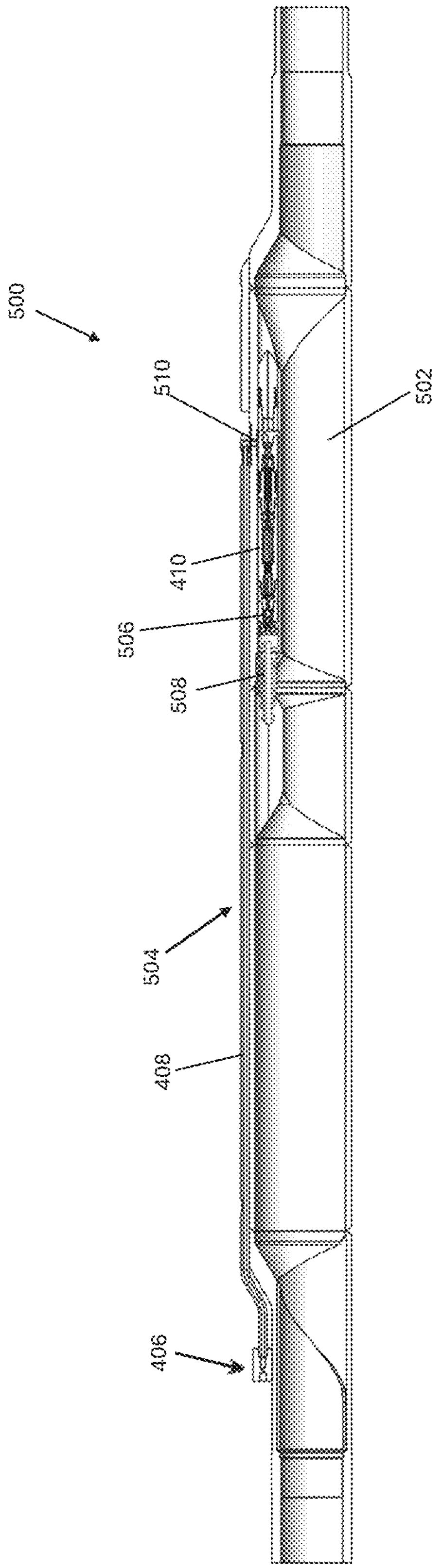
FIG. 5 shows a work string that includes the chemical injection sub, in another embodiment.

FIG. 5 shows a work string 500 that includes the chemical injection sub, in another embodiment. The work string 500 is designed to be retrievable from the borehole. The work string 500 includes a side pocket mandrel 502 and a splice sub 504 exterior to the side pocket mandrel 502. The splice sub 504 includes the chemical injection sub 406 and the control line 408. The side pocket mandrel 502 includes the back pressure valve 410 and a single check valve 506. The back pressure valve 410 is downhole of the single check valve 506. A seating nipple 508 is located uphole of the single check valve 506.

The control line 408 connects the chemical injection sub 406 to the back pressure valve 410 and provides fluid from the chemical injection sub 406 to an inlet 510 of the back pressure valve 410 that is at a downhole location of the back pressure valve 410. The fluid flows uphole through the back pressure valve 410 and to the single check valve 506.

Set forth below are some embodiments of the foregoing disclosure:

Embodiment 1. A valve of a chemical injection sub for use downhole. The valve includes a housing, a bore extending within the housing along a longitudinal axis of the housing, a first port at a first axial location along the housing, a second port at a second axial location along the housing, a filter disposed in the bore, the filter having an inlet at a first end and an outlet at a second end, and a floating device disposed within the filter, the floating device configured to allow a fluid to flow into the filter at the first end and to close the inlet based on an accumulation of debris within the filter.

Embodiment 2. The valve of any prior embodiment, further comprising a shear device that couples the filter to the housing at the first housing end, wherein the shear device is configured to separate when a force applied to the shear device by the filter exceeds a selected shear threshold.

Embodiment 3. The valve of any prior embodiment, wherein the filter is located upstream of the first port and the second port when it is attached at the first housing end and passes through the bore to cover the second port when the shear device separates.

Embodiment 4. The valve of any prior embodiment, wherein the accumulation of debris within the filter restricts a range of motion of the floating device toward the inlet.

Embodiment 5. The valve of any prior embodiment, wherein the floating device includes an air pocket.

Embodiment 6. The valve of any prior embodiment, wherein the filter is manufactured using additive manufacturing.

Embodiment 7. The valve of any prior embodiment, wherein the filter includes a nose extending from the outlet, the nose including a tip that is separated from the inlet by a gap region, wherein the floating device is contained to move within the gap region.

Embodiment 8. The valve of any prior embodiment, wherein the nose is designed to prevent the floating device from blocking flow of the fluid through the filter.

Embodiment 9. A work string includes a chemical injection sub having a valve. The valve includes a housing, a bore extending along a longitudinal axis of the housing, a first port at a first axial location along the housing, a second port at a second axial location along the housing, a filter disposed within the bore, wherein the filter including an inlet at a first end and an outlet at a second end, and a floating device disposed within the filter, the floating device configured to allow a flow of fluid into the filter at the first end and to close the inlet based on an accumulation of debris within the filter.

Embodiment 10. The work string of any prior embodiment, further comprising a shear device that couples the filter to the housing at the first housing end, wherein the shear device is configured to separate when a force applied to the shear device by the filter exceeds a selected shear threshold.

Embodiment 11. The work string of any prior embodiment, wherein the filter is located upstream of the first port and the second port when it is attached at the first housing end and passes through the bore to block the second port when the shear device separates.

Embodiment 12. The work string of any prior embodiment, wherein the accumulation of debris within the filter restricts a range of motion of the floating device toward the inlet.

Embodiment 13. The work string of any prior embodiment, wherein the floating device includes an air pocket.

Embodiment 14. The work string of any prior embodiment, wherein the filter is manufactured using additive manufacturing.

Embodiment 15. The work string of any prior embodiment, wherein the filter includes a nose extending from the outlet, the nose including a tip that is separated from the inlet by a gap region, wherein the floating device is contained to move within the gap region.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms “first,” “second,” and the like herein do not denote any order, quantity, or importance, but rather are used to distinguish one element from another. The terms “about”, “substantially” and “generally” are intended to include the degree of error associated with measurement of the particular quantity based upon the equipment available at the time of filing the application. For example, “about” and/or “substantially” and/or “generally” can include a range of +8% a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A valve of a chemical injection sub for use downhole, comprising:
- a housing;
- a bore extending within the housing along a longitudinal axis of the housing;
- a first port at a first axial location along the housing;
- a second port at a second axial location along the housing;
- a filter disposed in the bore, the filter having an inlet at a first end and an outlet at a second end; and
- a floating device disposed within the filter, the floating device configured to allow a fluid to flow into the filter at the first end and to close the inlet based on an accumulation of debris within the filter.

2. The valve of claim 1, further comprising a shear device that couples the filter to the housing at the first housing end, wherein the shear device is configured to separate when a force applied to the shear device by the filter exceeds a selected shear threshold.

3. The valve of claim 2, wherein the filter is located upstream of the first port and the second port when it is attached at the first housing end and passes through the bore to cover the second port when the shear device separates.

4. The valve of claim 1, wherein the accumulation of debris within the filter restricts a range of motion of the floating device toward the inlet.

5. The valve of claim 1, wherein the floating device includes an air pocket.

6. The valve of claim 1, wherein the filter is manufactured using additive manufacturing.

7. The valve of claim 1, wherein the filter includes a nose extending from the outlet, the nose including a tip that is separated from the inlet by a gap region, wherein the floating device is contained to move within the gap region.

8. The valve of claim 7, wherein the nose is designed to prevent the floating device from blocking flow of the fluid through the filter.

9. A work string, comprising:
- a chemical injection sub including a valve, the valve comprising:
- a housing;
- a bore extending along a longitudinal axis of the housing;
- a first port at a first axial location along the housing;
- a second port at a second axial location along the housing;
- a filter disposed within the bore, wherein the filter including an inlet at a first end and an outlet at a second end; and
- a floating device disposed within the filter, the floating device configured to allow a flow of fluid into the filter at the first end and to close the inlet based on an accumulation of debris within the filter.

10. The work string of claim 9, further comprising a shear device that couples the filter to the housing at the first housing end, wherein the shear device is configured to separate when a force applied to the shear device by the filter exceeds a selected shear threshold.

11. The work string of claim 10, wherein the filter is located upstream of the first port and the second port when it is attached at the first housing end and passes through the bore to block the second port when the shear device separates.

12. The work string of claim 9, wherein the accumulation of debris within the filter restricts a range of motion of the floating device toward the inlet.

13. The work string of claim 9, wherein the floating device includes an air pocket.

14. The work string of claim 9, wherein the filter is manufactured using additive manufacturing.

15. The work string of claim 9, wherein the filter includes a nose extending from the outlet, the nose including a tip that is separated from the inlet by a gap region, wherein the floating device is contained to move within the gap region.

* * * * *